US011257481B2

(12) United States Patent
Cui et al.

(10) Patent No.: US 11,257,481 B2
(45) Date of Patent: Feb. 22, 2022

(54) MULTI-TASK TRAINING ARCHITECTURE AND STRATEGY FOR ATTENTION-BASED SPEECH RECOGNITION SYSTEM (71) Applicant: TENCENT AMERICA LLC, Palo Alto, CA (US)

(72) Inventors: Jia Cui, Bellevue, WA (US); Chao Weng, Fremont, CA (US); Guangsen Wang, Shenzhen (CN); Jun Wang, Shenzhen (CN); Chengzhu Yu, Bellevue, WA (US); Dan Su, Shenzhen (CN); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 156 days.

(21) Appl. No.: 16/169,512

(22) Filed: Oct. 24, 2018

(65) Prior Publication Data
US 2020/0135174 A1 Apr. 30, 2020

(51) Int. Cl.
G10L 15/06 (2013.01)
G10L 25/03 (2013.01)
G10L 25/54 (2013.01)
G10L 15/10 (2006.01)

(52) U.S. Cl.
CPC ............ G10L 15/063 (2013.01); G10L 15/10 (2013.01); G10L 25/03 (2013.01); G10L 25/54 (2013.01)

(58) Field of Classification Search
CPC ...................................... G10L 15/16
See application file for complete search history.

(56) References Cited

U.S. PATENT DOCUMENTS

| 9,263,036 | B1* | 2/2016 | Graves | G06N 3/0445 |
|---|---|---|---|---|
| 2017/0011738 | A1* | 1/2017 | Senior | G10L 15/063 |
| 2017/0323636 | A1 | 11/2017 | Xiao et al. | |
| 2018/0005082 | A1 | 1/2018 | Bluche | |
| 2018/0330718 | A1* | 11/2018 | Hori | G06N 7/005 |
| 2019/0318725 | A1* | 10/2019 | Le Roux | G10L 15/22 |
| 2020/0027444 | A1* | 1/2020 | Prabhavalkar | G10L 15/16 |
| 2020/0043483 | A1* | 2/2020 | Prabhavalkar | G10L 15/063 |
| 2020/0066271 | A1* | 2/2020 | Li | G10L 19/00 |

(Continued)

OTHER PUBLICATIONS

Das, Amit, et al. "Advancing connectionist temporal classification with attention modeling." 2018 IEEE International Conference on Acoustics, Speech and Signal Processing (ICASSP). IEEE, 2018.*

(Continued)

Primary Examiner — Matthew H Baker
(74) Attorney, Agent, or Firm — Sughrue Mion, PLLC (57) ABSTRACT Methods and apparatuses are provided for performing sequence to sequence (Seq2Seq) speech recognition training performed by at least one processor. The method includes acquiring a training set comprising a plurality of pairs of input data and target data corresponding to the input data, encoding the input data into a sequence of hidden states, performing a connectionist temporal classification (CTC) model training based on the sequence of hidden states, performing an attention model training based on the sequence of hidden states, and decoding the sequence of hidden states to generate target labels by independently performing the CTC model training and the attention model training.

20 Claims, 6 Drawing Sheets

(56) References Cited

U.S. PATENT DOCUMENTS

2020/0168207 A1* 5/2020 Wang .................. G10L 15/16

OTHER PUBLICATIONS

Kim, Suyoun, Takaaki Hori, and Shinji Watanabe. "Joint CTC-attention based end-to-end speech recognition using multi-task learning." 2017 IEEE international conference on acoustics, speech and signal processing (ICASSP). IEEE, 2017.*

Zhang, Zhilu, and Mert Sabuncu. "Generalized cross entropy loss for training deep neural networks with noisy labels." Advances in neural information processing systems. 2018.*

Cui, Jia, et al. "Improving attention-based end-to-end asr systems with sequence-based loss functions." 2018 IEEE Spoken Language Technology Workshop (SLT). IEEE, 2018.*

Salazar, Julian, Katrin Kirchhoff, and Zhiheng Huang. "Self-attention networks for connectionist temporal classification in speech recognition." ICASSP 2019-2019 IEEE International Conference on Acoustics, Speech and Signal Processing (ICASSP). IEEE, 2019.*

Suyoun Kim et al., "Joint CTC-Attention Based End-to-End Speech Recognition Using Multi-Task Earning", https://arxiv.org/abs/1609.06773, 2017, 5 pages.

William Chan et al., "Listen, Attend and Spell", arXiv:1508.01211v2 [cs.CL], Aug. 20, 2015, 16 pages.

Hannun, "Sequence Modeling With CTC", Distill, 2017, Retrieved on Jul. 26, 2019, Retrieved from Internet URL: <https://distill.pub/2017/ctc/>, pp. 1-20 (total 20 pages).

Ueno et al., "Acoustic-to-word Attention-based Model Complemented with Character-Level CTC-Based Model", IEEE, ICASSP 2018, pp. 5804-5808 (total 5 pages).

International Search Report for PCT/US2019/035348 dated Aug. 8, 2019 [PCT/ISA/210].

Written Opinion of the International Searching Authority for PCT/US2019/035348 dated Aug. 8, 2019 [PCT/ISA/237].

* cited by examiner

MULTI-TASK TRAINING ARCHITECTURE AND STRATEGY FOR ATTENTION-BASED SPEECH RECOGNITION SYSTEM

BACKGROUND

1. Field

The present disclosure relates to methods and apparatuses for performing sequence to sequence (Seq2Seq) speech recognition, particularly, multi-task training for attention based Seq2Seq speech recognition.

2. Description of the Related Art

In related art speech recognition systems, acoustic signal and lexicons are modeled independently with two separate models such as an acoustic model and a language model, which are then combined only during decoding stage of training. The related art training, using the acoustic model, involves expansive expert knowledge and manual work. This process is simplified by an attention based Seq2Seq speech recognition model, which models acoustic and lexicon information simultaneously. However, such related art speech recognition systems fall behind the state-of-art hybrid systems in terms of recognition accuracy. Hybrid speech recognition systems are similar to the related art speech recognition systems, but with a neural network component in the acoustic model part.

Furthermore, related art end to end speech recognition systems include two major branches: CTC model and Seq2Seq model. The CTC model focuses on the frame classification and the lexicon dependency is modeled indirectly from CTC loss. The Seq2Seq model focuses more on lexicon dependencies and generates only a soft alignment on acoustic signals. These two models have been improved independent of each other until the recent work in NPL document 1, in which, these two models are combined to produce better recognition performance on a small data set.

However, the related art solution for combining CTC and Seq2Seq model is the simple interpolation of loss functions, in which, the interpolation weight has to be decided manually with several model building/testing cycles. For instance, in the related art speech recognition system, an interpolation weight w is given to combine the CTC loss (ctcL) and the original cross-entropy loss used by the attention model (attL) as follows: L=w*ctcL+(1−w)*attL. Here, the related art training tries to minimize the loss at every mini-step with predefined fixed weights. As such, usually several models with different weights are trained and tested to decide which weight should be selected. This process is not only cumbersome, but takes a long time and is inefficient, since this process requires individually training and testing the models with various different weights.

NPL DOCUMENTS

NPL document 1: S. Kim, T. Hori, and S. Watanabe, "Joint ctc-attention based end-to-end speech recognition using multi-task learning," in https://arxiv.org/abs/1609.06773, 2017.

SUMMARY

Provided are methods and apparatuses that improve the related art end to end recognition system by automatically and independently balancing the importance of two loss functions. Moreover, the methods and apparatuses of the present disclosure transform the encoder hidden layers before they are used by the attention model training, which significantly improves the attention model training quality and leads to much better performance improvement. Also, the time required for training and modeling is decreased because only one model needs to be trained as compared to the many different models with different weights (ws) in the related art.

According to an aspect of the present disclosure, there is provided a method of performing sequence to sequence (Seq2Seq) speech recognition training by at least one processor, the Seq2Seq speech recognition training method comprising: acquiring, by the at least one processor, a training set comprising a plurality of pairs of input data and target data corresponding to the input data; encoding, by an encoder implemented by the at least one processor, the input data into a sequence of hidden states; performing, by the at least one processor, a connectionist temporal classification (CTC) model training based on the sequence of hidden states; performing, by the at least one processor, an attention model training based on the sequence of hidden states; and decoding, by a decoder implemented by the at least one processor, the sequence of hidden states to generate target labels by independently performing the CTC model training and the attention model training.

The Seq2Seq speech recognition training method may further comprise: additionally transforming the sequence of hidden states using additional layers to enable content match between query and context; and performing the attention model training based on the additionally transformed sequence of hidden states.

The Seq2Seq speech recognition training method may further comprise: performing the CTC model training based on a CTC loss function.

The Seq2Seq speech recognition training method may further comprise: performing the attention model training based on a cross entropy loss function.

The independently performing the CTC model training and the attention model training may comprise: performing the CTC model training to minimize CTC loss during a first time period; and performing the attention model training to minimize cross entropy loss during a second period different from the first period.

The independently performing the CTC model training and the attention model training may comprise: performing a mini-batch based alternate training in which one of the CTC model training and the attention model training is randomly selected for optimization in each mini-batch.

The decoding by the decoder may comprise: generating a query information based on a previous target label and a previous prediction; generating a context information by calculating a soft alignment over all steps of the additionally transformed sequence of hidden states based on the query; and generating a target label based on the query information and the context information.

The context information may be a summary of speech signals encoded in hidden layers of the encoder.

The context information may be generated using scalar energy computed based on content similarity between the additionally transformed sequence of hidden states at each time step and the query information.

The CTC loss function may be defined as a mean of normalized edit distance between hypothesis H(x) and the corresponding targets, $$\text{Loss}(H, S) = \frac{1}{|S|} \sum_{x,t \in S} \frac{editDistance(H(x), t)}{|t|},$$

where S=(x, t) is the training set containing all pairs of input x and its corresponding target t.

According to another exemplary embodiment, there is provided a sequence to sequence (Seq2Seq) speech recognition training apparatus comprising: at least one memory operable to store program code; and at least one processor operable to read said program code and operate as instructed by said program code to: acquire a training set comprising a plurality of pairs of input data and target data corresponding to the input data; encode the input data into a sequence of hidden states; perform a connectionist temporal classification (CTC) model training based on the sequence of hidden states; perform an attention model training based on the sequence of hidden states; and decode the sequence of hidden states to generate target labels by independently performing the CTC model training and the attention model training.

The at least one processor may be further configured to: additionally transform the sequence of hidden states using additional layers to enable content match between query and context; and perform the attention model training based on the additionally transformed sequence of hidden states.

The at least one processor may be further configured to: perform the CTC model training based on a CTC loss function.

The at least one processor may be further configured to: perform the attention model training based on a cross entropy loss function.

The independently performing the CTC model training and the attention model training may comprise: performing the CTC model training to minimize CTC loss during a first time period; and performing the attention model training to minimize cross entropy loss during a second period different from the first period.

The independently performing the CTC model training and the attention model training may comprise: performing a mini-batch based alternate training in which one of the CTC model training and the attention model training is randomly selected for optimization in each mini-batch.

The decoding the sequence of hidden states to generate the target label may comprise: generating a query information based on a previous target label and a previous prediction; generating a context information by calculating a soft alignment over all steps of the additionally transformed sequence of hidden states based on the query; and generating a target label based on the query information and the context information.

The context information may be a summary of speech signals encoded in hidden layers of the encoder.

The context information may be generated using scalar energy computed based on content similarity between the additionally transformed sequence of hidden states at each time step and the query information.

The CTC loss function may be defined as a mean of normalized edit distance between hypothesis H(x) and the corresponding targets, $$\text{Loss}(H, S) = \frac{1}{|S|} \sum_{x,t \in S} \frac{editDistance(H(x), t)}{|t|},$$

where S=(x, t) is the training set containing all pairs of input x and its corresponding target t.

According to another embodiment, there is provided a non-transitory computer readable medium having stored thereon a program for performing sequence to sequence (Seq2Seq) speech recognition training method, the Seq2Seq speech recognition training method comprising: acquiring, by at least one processor, a training set comprising a plurality of pairs of input data and target data corresponding to the input data; encoding, by an encoder implemented by the at least one processor, the input data into a sequence of hidden states; performing, by the at least one processor, a connectionist temporal classification (CTC) model training based on the sequence of hidden states; performing, by the at least one processor, an attention model training based on the sequence of hidden states; and decoding, by a decoder implemented by the at least one processor, the sequence of hidden states to generate target labels by independently performing the CTC model training and the attention model training.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, Seq2Seq processing methods and apparatuses according to embodiments will be described in detail with reference to the accompanying drawings. The term such as "comprise" or "include" used herein should not be construed as necessarily including all of the elements or operations (or steps) described herein, and should be construed as not including some of the described elements or operations (or steps) or as further including additional elements or operations (or steps).

Although terms such as "first" and "second" may be used herein to describe various elements or components, the elements or components should not be limited by the terms. These terms are only used to distinguish one element or component from another element or component.

One or more embodiments of the present disclosure may address the multi-talker speech recognition, which recognize the multi-talker mixed overlap speech, in the scenario, such as cocktail party environment or other group environment.

Figure 1:
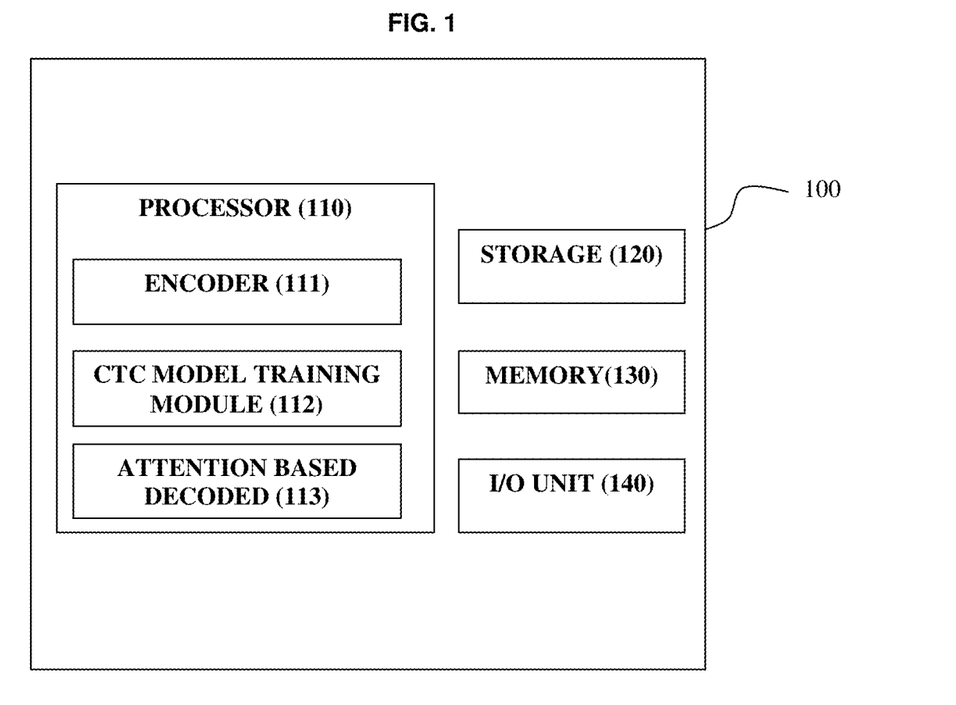
FIG. 1 is an apparatus implementing the multitask training technique for Seq2Seq speech recognition according to an embodiment.

FIG. 1 is a block diagram illustrating a Seq2Seq speech recognition system with multi-task training technique according to an embodiment. The Seq2Seq speech recognition system 100 may include a processor 110, storage 120, memory 130 and I/O unit 140. According to an embodiment, the processor 110 may include an encoder 111, a connectionist temporal classification (CTC) model training module 112, and an attention based decoder 113. According to an embodiment, the Seq2Seq speech recognition system 100 is an attention-based Seq2Seq system that views speech recognition as a sequence mapping problem using the encoder-decoder architecture. According to an embodiment, the processor 110 may include one or more processors configured to implement the encoder 111, the connectionist temporal classification (CTC) model training module 112, and the attention based decoder 113.

According to an embodiment, the Seq2Seq speech recognition system 100 may receive a set of input data sequence and respective target data sequence for training. The input data sequence may be an acoustic signals and the target data sequence may be characters (i.e., English characters), numbers (i.e., digits) or symbols. However, the input data and the target data may include other types of data.

According to an embodiment, the encoder 111 may encode the input data into a sequence of hidden states $h_u$. According to an embodiment, the encoder 111 may take all acoustic features and transform them into the sequence of hidden states $h_u$. According to an embodiment, the attention based decoder 113 may decode the sequence of hidden states to generate target labels by independently performing a CTC model training and an attention model training. According to an embodiment, the target labels may be English characters, digits, and some special symbols as well as the <SPACE> character. However, according to another embodiment, the target labels may include other characters and/or data.

According to an embodiment, the attention based decoder 113 may perform the attention model training by operating at the target sequence time step and generating, for each step, a query $s_i$ based on the input to the attention based decoder 113. The attention based decoder 113 may generate the query $s_i$ based on a previous target label $\hat{y}_{i-1}$, a previous prediction $v_{i-1}$, and previous query $s_{i-1}$ (as explained in detail in FIG. 2). According to an embodiment, context information $c_i$, which is a summary of speech signals encoded in hidden layers of the encoder, is also used by the attention based decoder 113 to generate the query $s_i$.

According to an embodiment, the attention based decoder 113 may include additional transform layers that transform the sequence of hidden states $h_u$ into a new sequence pattern $h'_u$. The additional transform layers may serve as a transformer to enable better content match between the query $s_i$ and context $c_i$. The multiple layers of the additional transform layers are not limited to bidirectional LSTM layers, and as such, other types of layers may be provided according to another embodiment.

According to an embodiment, the attention based decoder 113 may calculate the context information $c_i$ by performing a soft alignment over all steps of the additionally transformed sequence of hidden states $h'_u$ based on the query $s_i$. According to an embodiment, the context information may be generated using scalar energy computed based on content similarity between the additionally transformed sequence of hidden states $h'_u$ at each time step and the query information $s_i$.

According to an embodiment, the attention based decoder 113 may perform the attention model training based on the additionally transformed sequence of hidden states $h'_u$ to minimize cross entropy loss using a cross entropy loss function. According to an embodiment, the attention based decoder 113 may generate target labels based on the query information $s_i$ and the context information $c_i$.

According to an embodiment, the CTC model training module 112 may perform the CTC model training independent of the attention model training to minimize the CTC loss. The CTC model training may be based on a CTC loss function, which may be defined as a mean of normalized edit distance between hypothesis H(x) and the corresponding targets, $$\mathrm{Loss}(H, S) = \frac{1}{|S|} \sum_{x,t \in S} \frac{editDistance(H(x), t)}{|t|},$$

where S=(x, t) is the training set containing all pairs of input x and its corresponding target t. That is, given data set S with input/target utterance pairs (x,t), the CTC loss function is defined as the difference between sequences. The editDistance means the smallest number of insert(s), delete(s), and/or substitute(s) needed for the hypothesis H(x) to be transformed into the target t. The smaller the editDistance, the better the alignment between the input and the target sequences.

In speech recognition, a sequence of input acoustic signals could be mapped into a sequence of output labels (characters or words) by the automatic speech recognition (ASR) model. These label sequences are called hypothesis. They are associated with a score assigned by the ASR model and usually the one with the highest score is chosen as the decoding result.

According to an embodiment, the probability of a hypothesis is the sum over all possible output paths corresponding to that hypothesis. In CTC model training, each frame may be predicted independently, and therefore the probability of a path may simply the multiplication of each frame prediction.

In comparison with related art Seq2Seq speech recognition systems, the Seq2Seq speech recognition model of system 100 according to an embodiment of the present disclosure adds CTC loss function to guide the training of the encoder for better attention alignment.

According to an embodiment, the Seq2Seq speech recognition system 100 may independently perform the CTC model training and the attention model training by performing the CTC model training to minimize CTC loss during a first time period, and performing the attention model training to minimize cross entropy loss during a second period different from the first period. The term "first time period" and "the second time period" should not be considered as limiting the order of the CTC model training and the attention model training. Instead, term "first time period" and "the second time period" are used to explain that the CTC model training and the attention model training may be performed during different time periods.

According to an embodiment, the Seq2Seq speech recognition system 100 may independently perform the CTC model training and the attention model training by performing a mini-batch based alternate training, in which, one of the CTC model training and the attention model training is randomly selected for optimization in each mini-batch. The advantage of the minibatch alternate training method is that only one model needs to be trained during the minibatch.

As compared to the related art speech recognition system using interpolation weights to combine the CTC loss and the original cross entropy loss used by the attention model, which is not only cumbersome, but takes a long time to individually train and test the models with different weights, the Seq2Seq speech recognition system 100 independently optimizes the CTC loss function and the cross entropy loss function. Since the Seq2Seq speech recognition system 100 has no specific interpolation weights in its formulation, the speed and efficiency of training the input data is improved.

Moreover, in the related art attention models, attention weights are calculated based on content similarity and the candidates are frame vectors of the whole utterance. The CTC loss is associated with the alignment quality of predicted sequence and the reference. In the related art joint CTC-attention model training, the loss function prefers models with smaller CTC loss, and therefore the related art models are constrained by the temporal information. In contrast, the Seq2Seq speech recognition system 100 utilizes the alternate training model, where the impact is indirect. According to an embodiment, the CTC loss works more to ensure better acoustic features extraction than to enforce temporal information.

Figure 2:
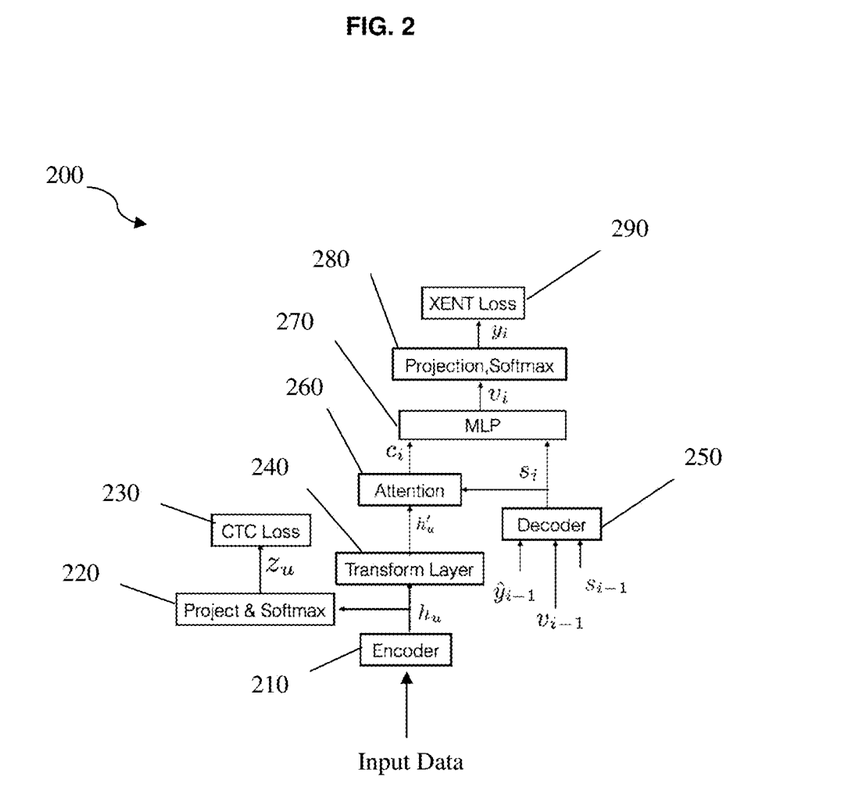
FIG. 2 is a diagram illustrating operations of the Seq2Seq speech recognition multitask training technique according to an embodiment.

FIG. 2 is a diagram illustrating operations of the Seq2Seq speech recognition multitask training technique 200 according to an embodiment. According to an embodiment, as illustrated in FIG. 2, the Seq2Seq speech recognition multitask training technique 200 may receive a set of input data sequence and respective target data sequence for training. The input data sequence may be an acoustic signals and the target data sequence may be characters (i.e., English characters), numbers (i.e., digits) or symbols. However, the input data and the target data may include other types of data.

According to an embodiment, the Seq2Seq speech recognition multitask training technique 200 may include an encoder 210, which encodes the input data into a sequence of hidden states $h_u$. According to an embodiment, the encoder 210 may take all acoustic features and transform them into the sequence of hidden states $h_u$. According to an embodiment, the Seq2Seq speech recognition multitask training technique 200 may decode the sequence of hidden states to generate target labels by independently performing a CTC model training and an attention model training. According to an embodiment, the target labels may be English characters, digits, and some special symbols as well as the <SPACE> character. However, according to another embodiment, the target labels may include other characters and/or data.

According to an embodiment, the attention model training may include one or more additional transform layers 240 that are provided between the encoder 210 and the decoder 250, which transform the sequence of hidden states $h_u$ into a new sequence pattern $h'_u$. The additional transform layers 240 may serve as a transformer to enable better content match between a query $s_i$ from the decoder and context $c_i$ from the attention module. The multiple layers of the additional transform layers are not limited to Bidirectional Long Short Term Memory (BLSTM) layers, and as such, other types of layers may be provided according to another embodiment. While the CTC model training keeps using the original encoder 210 output $h_u$, the attention model training by the decoder 250 uses the transformed $h'_u$ as input.

According to an embodiment, the attention module 260 may calculate the context information $c_i$ by performing a soft alignment over all steps of the additionally transformed sequence of hidden states $h'_u$ based on the query $s_i$. According to an embodiment, the context information $c_i$ may be generated using scalar energy computed based on content similarity between the additionally transformed sequence of hidden states $h'_u$ (i.e., additionally transformed hidden layers) at each time step and the query information $s_i$.

According to an embodiment, the attention model training utilizes the additionally transformed sequence of hidden states $h'_u$ to minimize cross entropy loss using a cross entropy loss function. According to an embodiment, the attention model training may generate target labels based on the query information $s_i$ and the context information $c_i$.

According to an embodiment, the decoder 250 may perform the attention model training by operating at the target sequence time step and generating, for each step, a query $s_i$ based on the input to the decoder 250. The decoder 250 may generate the query $s_i$ based on a previous target label $\hat{y}_{i-1}$, a previous prediction $v_{i-1}$, and previous query $s_{i-1}$. According to an embodiment, the context information $c_i$, which is a summary of speech signals encoded in hidden layers of the encoder 210, is also used by the decoder 250 to generate the query $s_i$.

According to an embodiment, the previous target label $\hat{y}_{i-1}$ is an output from the projection & softmax module 280 with embedding, and the previous prediction $v_{i-1}$ is the output from a multi-layer perceptron (MLP) module 270 before projection by the projection & softmax module 280.

According to an embodiment, the query $s_i$ and context information $c_i$, may be input into a MLP module 270, which is a multilayer perceptron, and the output $v_i$ of the MLP layer 270 is input into the projection & softmax module 280.

According to an embodiment, the projection & softmax module 280 may perform a projection, which is a linear transformation layer mapping the hidden layer into a vector which has the same dimension as the target. Instead of taking one step of hidden state for each lexicon prediction, the projection & softmax module 280 may produce a soft alignment over all steps of hidden states with the decoder's lexicon information si. Compared to a hard alignment where each input frame is mapped into one target label, the soft alignment may allow each frame to be mapped into multiple labels with different weights. The final output distribution for $y_i$ is a projection of the concatenation of decoder state $s_i$ and context $c_i$, as showed in Equation (1-4)

$$s_i = \text{LSTM}([s_{i-1},[\hat{y}_{i-1};v_{i-1}]]) \quad (1)$$

$$c_i = \text{AttentionContext}(s_i,h) \quad (2)$$

$$v_i = \tan h(W_h \cdot [s_i;c_i]) \quad (3)$$

$$P(y_i|x,y_{j<i}) = \text{softmax}(\text{proj}(v_i)) \quad (4)$$

According to an embodiment, the final output distribution for $y_i$ may be trained with cross entropy (XENT) loss module 290 of the output labels. The XENT loss module 290 may be implemented according to the following equation:

$$L_{att} = \frac{1}{|S|} \sum_{(x,t) \in S} \log P(t|x),$$

where S is the training data and (x,t) are input/target frame pairs.

According to an embodiment, the additionally transformed hidden layer $h'_u$ has the same dimension as the query $s_i$ from the decoder 250. The scalar energy $e_{i,u}$ is converted into a probability distribution $\alpha_{i,u}$ over times. The final context vector $c_i$ is the linear blending of hidden layer $h'_u$ with $\alpha_{i,u}$, as elaborated in Equation (5-7).

$$e_{i,u} = h_u^T W_a s_i \quad (5)$$

$$\alpha_{i,u} = \frac{\exp(e_{i,u})}{\sum_u \exp(e_{i,u})} \quad (6)$$

$$c_i = \sum_u \alpha_{i,u} h_u \quad (7)$$

Equations (5) and (7) use the symbol $h_u$ to represent hidden layers in an attention training model without additional transformation layers 240. However, according to an embodiment, the $h_u$ is replaced with $h'_u$ to represent the additionally transformed hidden layers in the attention model training. Also, $W_a$ is a matrix parameter which needs to be trained, and which decides how the hidden states $h_u$ and the queries $s_i$ are compared.

Figure 4:
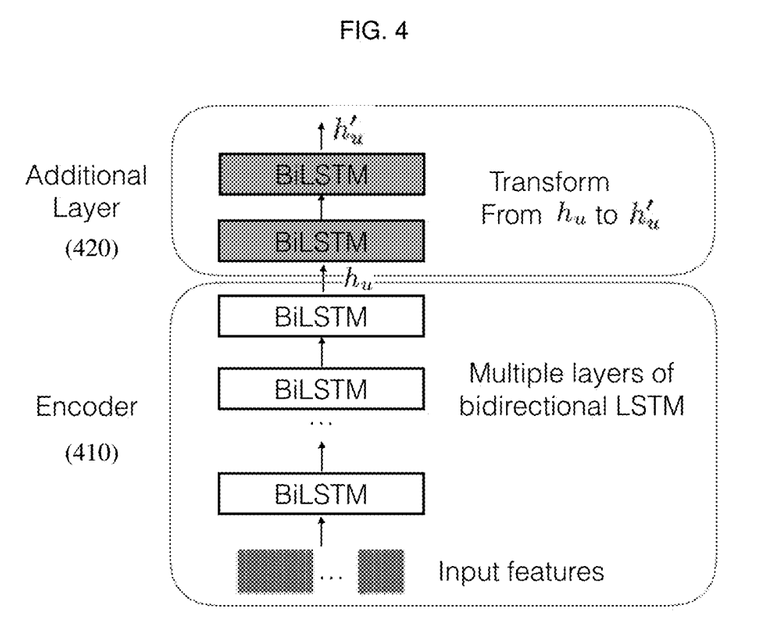
FIG. 4 is a diagram illustrating operations the additional transformation layer according to an embodiment.

FIG. 4 illustrates additional transform layers according to embodiment. As shown in FIG. 4, additional transform layers 420 may be added on top of the encoder 410. For instance, as illustrated in FIG. 4, two additional BiLSTM layers are provided to transform hidden layer $h_u$ output from the encoder 410 to a new pattern $h'_u$. In this manner, the CTC model training uses different hidden states from the attention model training. Also, such transformation enables the acoustic features to be transformed to a vector space which matches the lexicon queries.

According to an embodiment, the CTC model training may be implemented by one or more of the encoder 210, projection & softmax module 220 and CTC loss module 230. According to another embodiment, projection & softmax module 220 may be separate modules. Also, according to another embodiment, the encoder 210, the projection & softmax 220 and the CTC loss module 230 are provided in one or more different combination of modules. Moreover, the attention model training may be implemented by one or more of the transform layer 240, decoder 250, attention module 260, MLP module 270, projection & softmax layer 280 and XENT loss module 290. The CTC model training may include performing the CTC model training independent of the attention model training to minimize the CTC loss.

According to an embodiment, the CTC model training may include the encoder 210 encoding the input data into a sequence of hidden states $h_u$. According to an embodiment, the encoder 210 may take all acoustic features and transform them into the sequence of hidden states $h_u$. According to an embodiment, the encoder 210 may include multiple layers of BLSTM. However, different types and numbers of layers may be provided according to another embodiment. Next, the project & softmax module 220 receives the sequence of hidden states $h_u$ and performs projection and soft-alignment operations on the sequence of hidden states $h_u$ to reduce dimension.

Thereafter, the CTC model training may include the CTC loss module 230 receiving the output $Z_u$ from the project & softmax module 220 an performing a CTC loss function. According to an embodiment, the CTC loss function may be defined as a mean of normalized edit distance between hypothesis H(x) and the corresponding targets, $$\text{Loss}(H, S) = \frac{1}{|S|} \sum_{x,t \in S} \frac{editDistance(H(x), t)}{|t|},$$

where S=(x, t) is the training set containing all pairs of input x and its corresponding target t. That is, given data set S with input/target utterance pairs (x,t), the CTC loss function is defined as the difference between sequences. The editDistance means the smallest number of insert(s), delete(s), and/or substitute(s) needed for the hypothesis H(x) to be transformed into the target t. The smaller the editDistance, the better the alignment between the input and the target sequences.

Figure 3:
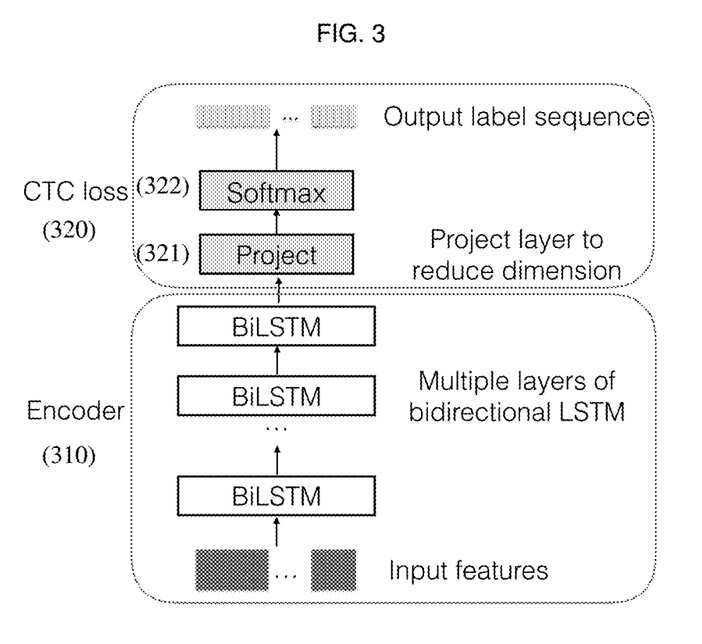
FIG. 3 is a diagram illustrating operations of the CTC training model according to an embodiment.

FIG. 3 illustrates the CTC model training according to another embodiment. The CTC model training may include the encoder 310 encoding input features into a sequence of hidden states $h_u$. According to an embodiment, the encoder 310 may take all acoustic features and transform them into the sequence of hidden states $h_u$.

According to an embodiment, the encoder 310 may include multiple layers of bidirectional LSTM (BLSTM). However, different types and numbers of layers may be provided according to another embodiment. Next, a CTC loss module 320 may receive the sequence of hidden states $h_u$ and perform projection and soft-alignment operations on the sequence of hidden states $h_u$ to reduce dimension. According to the embodiment, the projection and soft-alignment operations are performed by different modules (i.e., project module 321 and softmax module 322). The projection module 321 may project the sequence of hidden states $h_u$ to reduce dimension.

The CTC model training may include performing a CTC loss function as shown in equations 8-10, based on the output label sequence from the softmax module 322:

$$\text{Loss}(H, S) = \frac{1}{|S|} \sum_{x,t \in S} \frac{editDistance(H(x), t)}{|t|}, \quad (8)$$

$$p(l|x) = \sum_{\pi \in \mathcal{D}(l)} p(\pi|x) = \sum_{\pi \in \mathcal{D}(l)} \prod_u z_{\pi_u}^u \quad (9)$$

$$z_u = \text{softmax}(proj(h_u)) \quad (10)$$

According to an embodiment, the CTC loss function may be defined as a mean of normalized edit distance between hypothesis H(x) and the corresponding targets, $$\text{Loss}(H, S) = \frac{1}{|S|} \sum_{x,t \in S} \frac{editDistance(H(x), t)}{|t|},$$

where S=(x, t) is the training set containing all pairs of input x and its corresponding target t. That is, given data set S with input/target utterance pairs (x,t), the CTC loss function is defined as the difference between sequences. The editDistance means the smallest number of insert(s), delete(s), and/or substitute(s) needed for the hypothesis H(x) to be transformed into the target t. The smaller the editDistance, the better the alignment between the input and the target sequences.

According to an embodiment, the probability of generating a hypothesis/(without special "blank" symbols or duplicates) from x is the sum over all possible output paths π corresponding to l, where π is an output sequence which has the same dimension as the input sequence x. In CTC model training, each frame is predicted independently so the probability of π is simply the multiplication of each frame prediction $Z_u$.

Attention-based Seq2Seq views speech recognition as a sequence mapping problem by using the encoder-decoder architecture. The encoder takes all acoustic features and transform them into a sequence of hidden states. The decoder runs at the target sequence time step. For each step, a query is generated from the decoder's input and used to compute a soft weight matrix over the encoder's outputs. For each specific implementation, the query generation, the soft weight calculation and the usage of the query results can be different.

According to an embodiment, the independent performance of the CTC model training and the attention model training may include alternately training using the CTC model and the attention model instead of jointly training the CTC model training and the attention model training as in related art systems. FIG. 4 illustrates the alternate training technique according to an embodiment of the present disclosure.

Figure 5:
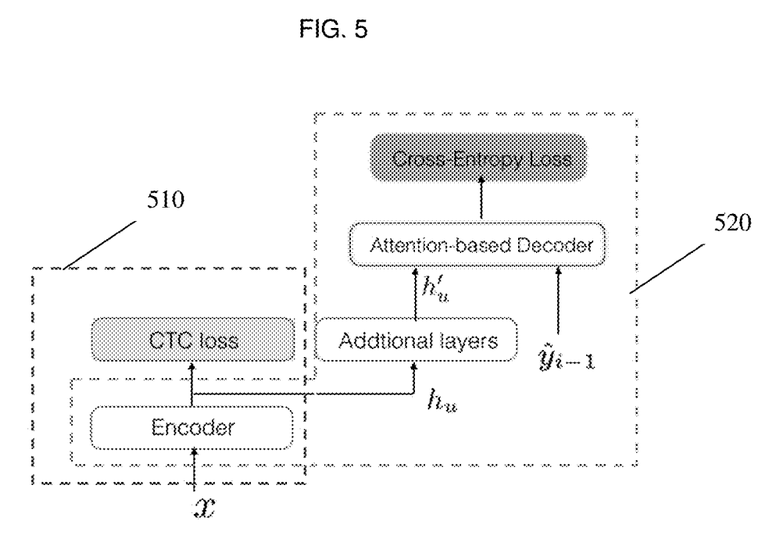
FIG. 5 is a diagram illustrating operations the alternate training models with different loss functions according to an embodiment.

According to an embodiment, the alternate training may be an epoch-based alternate training as illustrated in FIG. 5. In the epoch-based alternate training, there are two steps in each epoch (or time period). In a first epoch, all input data is processed to minimize CTC loss (510), and in a second epoch, all the input data are processed again to minimize cross entropy loss (520). The order the training is not limited, such that, according to another embodiment, all the input data may be processed to minimize cross entropy loss (520) in a first epoch and all input data is processed again to minimize CTC loss (510) in a second epoch.

According to another embodiment, the alternate training may be a minibatch-based alternate training. According to the minbatch-based alternate training, in each minibatch, one of the loss functions is randomly chosen to be optimized. The advantage of the minbatch-based alternate training method is that only one model needs to be trained.

Figure 6:
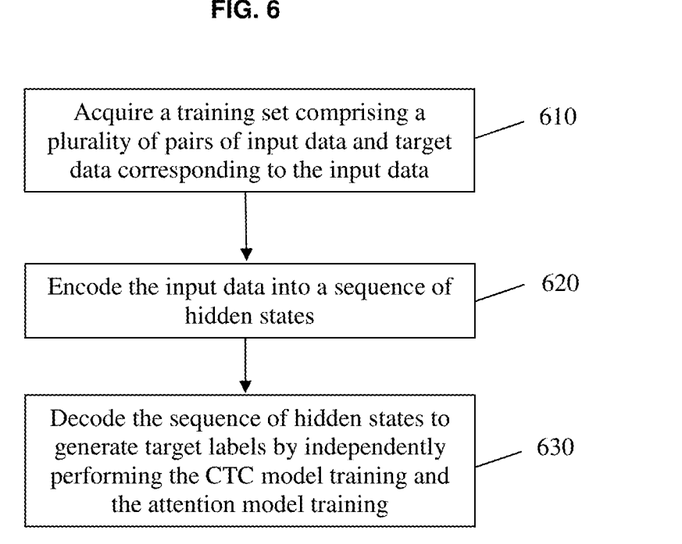
FIG. 6 is a flowchart illustrating operations of curriculum training according to an embodiment.

FIG. 3 is a flowchart illustrating operations of the multitask training architecture and strategy for attention-based speech recognition system according to an embodiment.

At 610, one or more processors may acquire a training set comprising a plurality of pairs of input data and target data corresponding to the input data.

At 620, the one or more processor may encode the input data into a sequence of hidden states.

At 630, the one or more processors may decode the sequence of hidden states to generate target labels by independently performing the CTC model training and the attention model training.

At 630, the one or more processors may perform the attention model training by operating at the target sequence time step and generating, for each step, a query $s_i$ based on a previous target label $\hat{y}_{i-1}$, a previous prediction $v_{i-1}$, and previous query $s_{i-1}$. According to an embodiment, the one or more processors may also use context information $c_i$, which is a summary of speech signals encoded in hidden layers of the encoder, to generate the query $s_i$.

According to an embodiment, at 630 the one or more processors may include transform the sequence of hidden states $h_u$ into a new sequence pattern $h'_u$ using additional transformation layers. The additional transform layers may serve as a transformer to enable better content match between the query $s_i$ and context $c_i$.

According to an embodiment, the one or more processors may calculate the context information $c_i$ by performing a soft alignment over all steps of the additionally transformed sequence of hidden states $h'_u$ based on the query $s_i$. According to an embodiment, the context information may be generated using scalar energy computed based on content similarity between the additionally transformed sequence of hidden states $h'_u$ at each time step and the query information $s_i$.

According to an embodiment, the one or more processors may perform the attention model training based on the additionally transformed sequence of hidden states $h'_u$ to minimize cross entropy loss using a cross entropy loss function. According to an embodiment, the one or more processors may generate target labels based on the query information $s_i$ and the context information $c_i$.

According to an embodiment, the one or more processors may perform the CTC model training independent of the attention model training to minimize the CTC loss. The CTC model training may be based on a CTC loss function, which may defined as a mean of normalized edit distance between hypothesis H(x) and the corresponding targets, $$\text{Loss}(H, S) = \frac{1}{|S|} \sum_{x,t \in S} \frac{editDistance(H(x), t)}{|t|},$$

where S=(x, t) is the training set containing all pairs of input x and its corresponding target t. That is, given data set S with input/target utterance pairs (x,t), the CTC loss function is defined as the difference between sequences. The editDistance means the smallest number of insert(s), delete(s), and/or substitute(s) needed for the hypothesis H(x) to be transformed into the target t. The smaller the editDistance, the better the alignment between the input and the target sequences.

According to an embodiment, at 630, the one or more processors may independently perform the CTC model training and the attention model training by performing the CTC model training to minimize CTC loss during a first time period, and performing the attention model training to minimize cross entropy loss during a second period different from the first period. The term "first time period" and "the second time period" should not be considered as limiting the order of the CTC model training and the attention model training. Instead, term "first time period" and "the second time period" are used to emphasize that the CTC model training and the attention model training are performed during different time periods.

According to an embodiment, the Seq2Seq speech recognition system 100 may independently perform the CTC model training and the attention model training by performing a mini-batch based alternate training in which one of the CTC model training and the attention model training is randomly selected for optimization in each mini-batch. The advantage of the minibatch alternate training method is that only one model needs to be trained during the minibatch.

The units and modules described herein may be implemented using hardware components and software components. For example, the hardware components may include microphones, amplifiers, band-pass filters, audio to digital converters, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor, hardware circuitry or any other device capable of responding to and executing instructions in a defined manner. The processing device also may access, store, manipulate, process, and create data in response to execution of the software.

Moreover, the operations and functions illustrated in FIGS. 1-6 and the corresponding description in this specification are not limited to the modules and units illustrated in this disclosure. As such, the operations and functions may be implemented by another module and/or other combinations of modules according to another embodiment.

The software may include a computer program, a piece of code, an instruction, or some combination thereof, to independently or collectively instruct or configure the processing device to operate as desired. The method according to the above-described example embodiments may be recorded in non-transitory computer-readable media including program instructions to implement various operations of the above-described example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like.

Experimental Results

The Seq2Seq speech recognition system 100 according to an embodiment significantly improves speech recognition performance in terms of word error rate (WER) compared to related art Seq2Seq systems as shown in the comparisons in table 1 and table 2 below.

TABLE 1

Performance with Different Multi-task Training

| Models | SWB | | CaliHome | |
|---|---|---|---|---|
| | w/o LM | w/LM | w/o LM | w/LM |
| Baseline | 15.0 | 14.3 | 25.1 | 24.5 |
| +CTC pre-train | 14.6 | 13.8 | 25.0 | 24.5 |
| +CTC joint | 14.0 | 13.3 | 24.9 | 24.4 |
| +alternate-M | 17.0 | 16.4 | 28.4 | 27.7 |
| +alternate-T | 14.1 | 13.5 | 24.6 | 24.0 |
| +alternate | 13.0 | 12.3 | 23.8 | 23.3 |

TABLE 2

Compare with other end-to-end speech recognition systems

| Systems | SWB | CH |
|---|---|---|
| Attention Seq2Seq + Trigram[30] | 25.8 | 46.0 |
| BRNN Grapheme CTC + Ngram [45] | 20.0 | 31.8 |
| BLSTM Phoneme CTC + Fisher LM [46] | 14.8 | n/a |
| Acoutice-to-Word + noLM [47] | 14.5 | 25.1 |
| Iterated CTC + RNN WLM [48] | 14.0 | 25.3 |
| CTC + Seq2Seq + charLM(this work) | 12.3 | 23.3 |

On a benchmark data set SWB300h, the Seq2Seq speech recognition system 100 of the present disclosure outperforms all reported results with Seq2Seq models and CTC models as shown in Table 2. This method gives word error rate 12.3% while the related art Attention Seq2Seq model reported only 25.8%. Moreover, the Seq2Seq speech recognition system 100 of the present disclosure yields 13% relative improvement while the related art joint training model yields only 6% relative improvement, as shown in Table 1. Moreover, the alternate training feature of the Seq2Seq speech recognition system 100 according to an embodiment of the present disclosure shortens the overall training time by balancing the CTC and cross-entropy loss automatically during the training process, while in the related art joint training model, several models need to be trained and tested to decide the interpolation weight.

The present disclosure has been described above with reference to embodiments. However, those of ordinary skill in the art will understand that various changes in form and details may be made therein without departing from the spirit and scope of the present disclosure as defined by the appended claims. Therefore, the above embodiments should be considered in descriptive sense only and not for purposes of limitation. Thus, the scope of the present disclosure may be defined not by the above detailed descriptions but by the appended claims, and all differences within the scope will be construed as being included in the present disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of performing sequence to sequence (Seq2Seq) speech recognition training by at least one processor, the Seq2Seq speech recognition training method comprising:
    acquiring, by the at least one processor, a training set comprising a plurality of pairs of input data and target data corresponding to the input data;
    encoding, by an encoder implemented by the at least one processor, the input data into a sequence of hidden states;
    performing, by the at least one processor, a connectionist temporal classification (CTC) model training based on the sequence of hidden states;
    performing, by the at least one processor, an attention model training based on a new sequence of hidden states generated based on the sequence of hidden states, the new sequence of hidden states being different from the sequence of hidden states used by the CTC model training; and
    decoding, by a decoder implemented by the at least one processor, the sequence of hidden states to generate target labels by independently performing the CTC model training and the attention model training based on the same input data.

2. The Seq2Seq speech recognition training method of claim 1, further comprising:
    additionally transforming the sequence of hidden states using additional layers to generate the new sequence of hidden states to enable content match between query and context.

3. The Seq2Seq speech recognition training method of claim 2, wherein the decoding by the decoder comprises:

generating a query information based on a previous target label and a previous prediction;

generating a context information by calculating a soft alignment over all steps of the additionally transformed sequence of hidden states based on the query; and generating a target label based on the query information and the context information.

4. The Seq2Seq speech recognition training method of claim 3, wherein the context information is a summary of speech signals encoded in hidden layers of the encoder.

5. The Seq2Seq speech recognition training method of claim 3, wherein the context information is generated using scalar energy computed based on content similarity between the additionally transformed sequence of hidden states at each time step and the query information.

6. The Seq2Seq speech recognition training method of claim 1, further comprising:

performing the CTC model training based on a CTC loss function.

7. The Seq2Seq speech recognition training method of claim 6, wherein the CTC loss function is defined as a mean of normalized edit distance between hypothesis H(x) and the corresponding targets, $$\text{Loss}(H, S) = \frac{1}{|S|} \sum_{x,t \in S} \frac{editDistance(H(x), t)}{|t|}$$

where S=(x, t) is the training set containing all pairs of input x and its corresponding target t.

8. The Seq2Seq speech recognition training method of claim 1, further comprising:

performing the attention model training based on a cross entropy loss function.

9. The Seq2Seq speech recognition training method of claim 1, wherein the independently performing the CTC model training and the attention model training comprises:

performing the CTC model training to minimize CTC loss during a first time period; and performing the attention model training to minimize cross entropy loss during a second period different from the first period.

10. The Seq2Seq speech recognition training method of claim 1, wherein the independently performing the CTC model training and the attention model training comprises:

performing a mini-batch based alternate training in which one of the CTC model training and the attention model training is randomly selected for optimization in each mini-batch.

11. A sequence to sequence (Seq2Seq) speech recognition training apparatus comprising:

at least one memory operable to store program code; and at least one processor operable to read said program code and operate as instructed by said program code to:

acquire a training set comprising a plurality of pairs of input data and target data corresponding to the input data;

encode the input data into a sequence of hidden states;

perform a connectionist temporal classification (CTC) model training based on the sequence of hidden states;

perform an attention model training based on a new sequence of hidden states generated based on the sequence of hidden states, the new sequence of hidden states being different from the sequence of hidden states used by the CTC model training; and decode the sequence of hidden states to generate target labels by independently performing the CTC model training and the attention model training based on the same input data.

12. The Seq2Seq speech recognition training apparatus of claim 11, wherein the at least one processor is further configured to:

additionally transform the sequence of hidden states using additional layers to generate the new sequence of hidden states to enable content match between query and context.

13. The Seq2Seq speech recognition training apparatus of claim 12, wherein the decoding the sequence of hidden states to generate the target label comprises:

generating a query information based on a previous target label and a previous prediction;

generating a context information by calculating a soft alignment over all steps of the additionally transformed sequence of hidden states based on the query; and generating a target label based on the query information and the context information.

14. The Seq2Seq speech recognition training apparatus of claim 13, wherein the context information is a summary of speech signals encoded in hidden layers of the encoder.

15. The Seq2Seq speech recognition training apparatus of claim 13, wherein the context information is generated using scalar energy computed based on content similarity between the additionally transformed sequence of hidden states at each time step and the query information.

16. The Seq2Seq speech recognition training apparatus of claim 11, wherein the at least one processor is further configured to:

perform the CTC model training based on a CTC loss function.

17. The Seq2Seq speech recognition training apparatus of claim 11, wherein the at least one processor is further configured to:

perform the attention model training based on a cross entropy loss function.

18. The Seq2Seq speech recognition training apparatus of claim 11, wherein the independently performing the CTC model training and the attention model training comprises:

performing the CTC model training to minimize CTC loss during a first time period; and performing the attention model training to minimize cross entropy loss during a second period different from the first period.

19. The Seq2Seq speech recognition training apparatus of claim 11, wherein the independently performing the CTC model training and the attention model training comprises:

performing a mini-batch based alternate training in which one of the CTC model training and the attention model training is randomly selected for optimization in each mini-batch.

20. A non-transitory computer readable medium having stored thereon a program for performing sequence to sequence (seq2seq) speech recognition training method, the Seq2Seq speech recognition training method comprising:

acquiring, by at least one processor, a training set comprising a plurality of pairs of input data and target data corresponding to the input data;

encoding, by an encoder implemented by the at least one processor, the input data into a sequence of hidden states;

performing, by the at least one processor, a connectionist temporal classification (CTC) model training based on the sequence of hidden states;

performing, by the at least one processor, an attention model training based on a new sequence of hidden states generated based on the sequence of hidden states, the new sequence of hidden states being different from the sequence of hidden states used by the CTC model training; and decoding, by a decoder implemented by the at least one processor, the sequence of hidden states to generate target labels by independently performing the CTC model training and the attention model training on the same input data.

* * * * *